United States Patent [19]

Ando

[11] 4,213,517

[45] Jul. 22, 1980

[54] ELEVATOR CONTROL SYSTEM

[75] Inventor: Koji Ando, Itami, Japan

[73] Assignee: Fujitec Co., Ltd., Osaka, Japan

[21] Appl. No.: 922,430

[22] Filed: Jul. 6, 1978

[51] Int. Cl.² .............................................. B66B 1/30
[52] U.S. Cl. ................................................... 187/29 R
[58] Field of Search ......................................... 187/29

[56]  References Cited

U.S. PATENT DOCUMENTS

| 3,687,235 | 8/1972 | Mitsui et al. | 187/29 |
| 4,042,069 | 8/1977 | Ohira et al. | 187/29 |
| 4,068,741 | 1/1978 | Ficheux et al. | 187/29 |

Primary Examiner—J. V. Truhe
Assistant Examiner—W. E. Duncanson, Jr.
Attorney, Agent, or Firm—Wenderoth, Lind & Ponack

[57]  ABSTRACT

An elevator control system includes a power source which supplies AC power to an induction motor for driving an elevator car through a first thyristor gate circuit. Another induction motor provided for braking the elevator car is connected to the power source through a second thyristor gate circuit. A tachometer generator connected to the induction motors produces an speed signal indicative of the speed of the elevator car. The speed signal is compared with a reference signal and the difference therebetween is used to control the first and second thyristor gate circuits for controlling the elevator car speed.

13 Claims, 5 Drawing Figures

ELEVATOR CONTROL SYSTEM

BACKGROUND OF THE INVENTION

The present invention relates to an elevator and, more particularly, to a control system for controlling the movement of an elevator car.

In order to obtain a comfortable ride on the elevator car during the movement thereof, it is preferable to gradually increase the speed of the elevator car at the beginning of the movement of the car until it reaches a predetermined speed and, to gradually decrease the speed to stop the movement. More particularly, during the increase in speed of the elevator car, that is, during the acceleration thereof, it is preferable to gradually increase the acceleration. When starting the movement of the elevator car, it is accelerated gradually to reach a predetermined acceleration. Thereafter, the acceleration of the elevator car is gradually decreased to zero to run the elevator car at a predetermined speed. In a similar manner, during the decrease in speed of the elevator car, that is, during the deceleration, it is preferable to gradually increase the deceleration at the beginning thereof to reach a predetermined deceleration and to gradually decrease the deceleration at the ending thereof to stop the elevator car.

In order to accomplish the above described movement of the elevator car, there have been proposed various methods and systems for controlling the driving means for driving the elevator. In FIG. 1, there is shown a circuit diagram of one conventional control system for controlling the movement of the elevator car. This control system includes two induction motors HM and LM whose rotating shafts are connected to each other and are further connected to a traction sheave (not shown) which moves the elevator car up and down upon rotation thereof. The induction motor HM or high speed motor is provided for starting and accelerating the elevator car while the other induction motor LM or low speed motor is provided for decelerating the elevator car. The high speed motor HM is connected to a three phase AC power source through three lead lines R, S and T each including a plurality of resistors connected in series. The movement of the elevator car is described hereinbelow with reference to the graph of FIG. 2 showing the relation between the speed of the elevator car and the time.

When the three phase AC power is supplied to the induction motor HM through the resistors, the induction motor starts to rotate and, thus the elevator car starts moving (region A in FIG. 2). As the resistors in each line are shortcircuited one after another by a suitable switching means, the rotation of the induction motor HM increases to accelerate the elevator car and to cause the elevator car to move at a predetermined speed (region B in FIG. 2). When the elevator car reaches a point a predetermined distance away from the point where the car should stop, the induction motor HM is disconnected from the power source and the other induction motor LM is connected to the power source so as to decelerate the elevator car by the regenerative braking effect produced by the low speed induction motor LM (region C in FIG. 2). However, this regenerative braking does not completely stop the elevator car but only reduces the speed of the car to a very low speed determined by the rated revolution thereof. Then, when the elevator car reaches the point where the car should stop, the induction motor LM is disconnected from the power source and electromagnetic braking is applied to the elevator to completely stop the elevator car (region D in FIG. 2).

Therefore, the control system described above is disadvantageous because the elevator car is accelerated to a greater degree each time one of the resistors is shortcircuited and because it takes a very long period of time before the car is completely stopped from the moment when the car is decelerated. Furthermore, the movement of the car changes abruptly at the moment when the induction motor HM starts to move the car or when the induction motor LM starts to decelerate the car. Therefore, this gives an uncomfortable ride to the passengers in the elevator car.

SUMMARY OF THE INVENTION

Accordingly, a primary object of the present invention is to provide an improved type of control system which smoothly changes the speed of the elevator car during the acceleration and deceleration for the elevator car to reach a destination in a very short period of time.

Another object of the present invention is to provide an improved type of control system of the above described type which is effective to stop the movement of the elevator car at a predetermined position with high accuracy.

A further object of the present invention is to provide an improved type of control system of the above described type which can be adjusted and maintained easily.

In accordance with a preferred embodiment of the invention, the elevator car control system is constituted by a power supplying section producing AC power, driving and braking sections for driving and braking the elevator car, and a power control section which controls the power supplying section to control or adjust the speed of the elevator car. The power control section comprises means for generating an actual speed signal indicative of the instantaneous speed of the elevator car, a reference signal producing circuit producing a desired speed signal indicative of the desired speed of the elevator car, a comparator for comparing the voltage difference between the reference signal and actual speed signal and for selectively producing a positive signal when the voltage of the actual speed signal falls below that of the reference signal and a negative signal when the voltage of the actual speed signal exceeds that of the reference signal, and a control circuit which controls the power supplying section to increase the supply of power to the driving section upon receipt of a positive signal and to increase the dynamic braking effect from the braking section upon receipt of a negative signal. The control circuit comprising a first phase controller so connected as to receive the positive signal, and an inverter and a second phase controller so connected as to receive the negative signal.

BRIEF DESCRIPTION OF THE DRAWINGS

These and other objects and features of the present invention will become apparent from the following description taken in conjunction with preferred embodiments thereof with reference to the accompanying drawings, in which:

FIG. 1 being a circuit diagram of one conventional control system and

FIG. 2 being a graph showing the relation of the speed of the elevator car controlled by the conventional control system relative to the time;

DETAILED DESCRIPTION OF THE INVENTION

Figure 1:
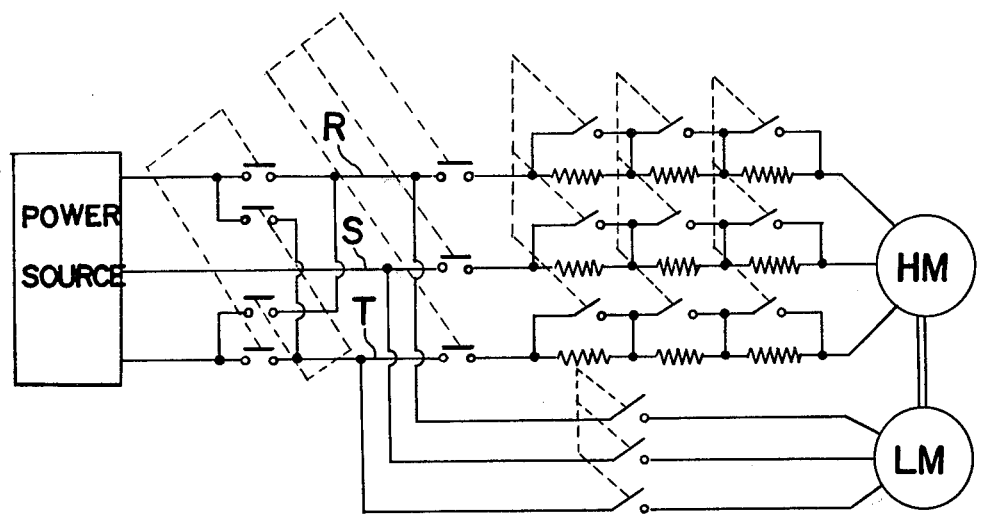
FIGS. 1 and 2 have already been referred to in the foregoing description.
Figure 2:
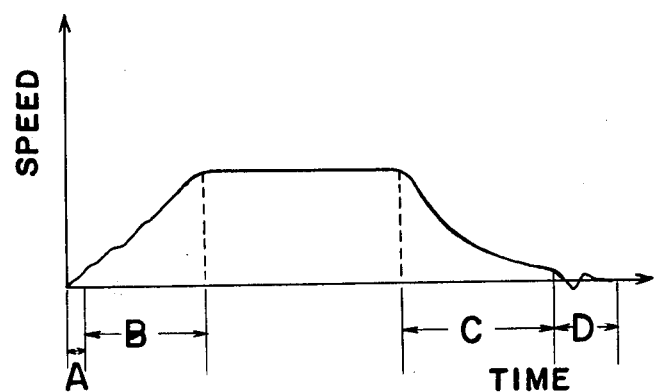

Before the description of the present invention proceeds, note that like parts are designated by like reference numerals throughout the accompanying drawings.

Figure 3:
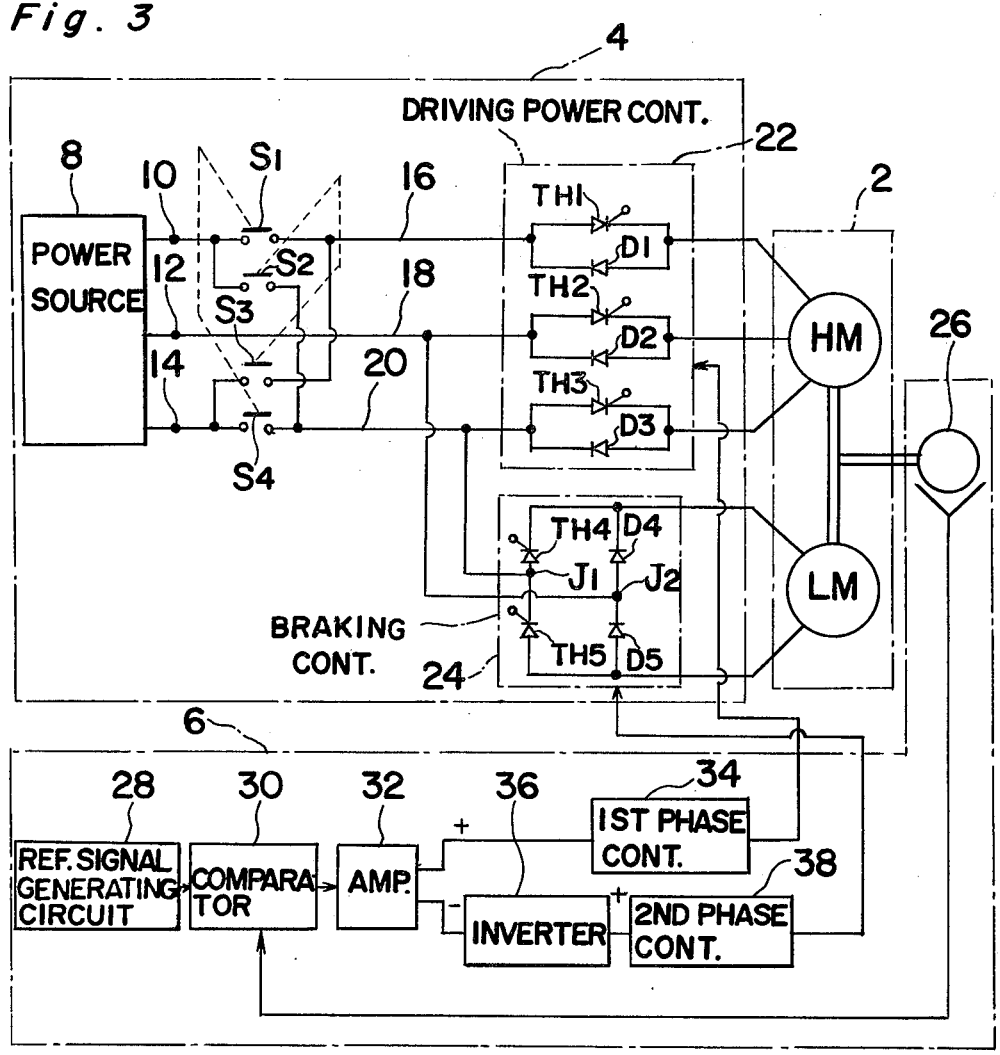
FIG. 3 is a circuit diagram of an elevator control system according to one embodiment of the present invention.

Referring to FIG. 3, there is shown one embodiment of an elevator control system of the present invention. The control system is divided mainly into three sections, i.e., a driving and braking section 2 for driving and braking an elevator car (not shown), a power supplying section 4 for supplying electric power to the driving and braking section 2 and a power control section 6 for controlling the power supplied to the driving and braking section 2. Each of the sections will now be described in detail.

The driving and braking section 2 comprises two induction motors HM and LM. The induction motor HM is so designed as to rotate at comparatively high speed while the induction motor LM is so designed as to rotate at comparatively low speed. The induction motors HM and LM have their own rotating shafts connected to each other through a common shaft are further connected to a traction sheave (not shown) which moves the elevator car up and down during the rotation of the common shaft.

The power supplying section 4 comprises a power source 8 which produces three phase AC power from output terminals 10, 12 and 14. The terminal 10 is connected to one side of a switch S1 and also to one side of a switch S2. The other side of the switch S1 is connected to a lead line 16 and the other side of the switch S2 is connected to a lead line 20. In a similar manner, the terminal 14 is connected to one side of a switch S3 and also to one side of a switch S4. The other sides of the switches S3 and S4 are connected to the lead lines 16 and 20, respectively. The terminal 12 is connected directly to a lead line 18. Note that the switches S1, S2, S3 and S4 are normally opened switches and that the switches S1 and S4 are closed simultaneously to supply the three phase AC power to the lead lines 16, 18 and 20 in one sequential order while the switches S2 and S3 are closed simultaneously to supply the three phase AC power to the lead lines 16, 18 and 20 in the other sequential order. The lead lines 16, 18 and 20 are connected to a first gate means or a driving power control 22 comprising power controlling elements such as thyristors TH1, TH2 and TH3, and diodes D1, D2 and D3. The thyristors TH1, TH2 and TH3 have their anodes connected to the lead lines 16, 18 and 20, respectively, while their cathodes are connected to three input terminals of the high speed induction motor HM. The diodes D1, D2 and D3 are connected in parallel to the respective thyristors TH1, TH2 and TH3 in a reverse polarity as to each of the thyristors.

The power supplying section 4 further comprises a second gate means or a braking control 24 including power controlling elements such as thyristors TH4 and TH5 and diodes D4 and D5 which are connected in a mixed bridge rectification network. More specifically, the thyristors TH4 and TH5 are connected in series in the same polarity as to each other while the diodes D4 and D5 are connected in series in the same polarity as to each other. The series circuit of the thyristors TH4 and TH5 is connected in parallel to the series circuit of the diodes D4 and D5 in the same polarity and is further connected to the input terminals of the low speed induction motor LM. The junction J1 between the thyristors TH4 and TH5 is connected to the lead line 20, and the junction J2 between the diodes D4 and D4 is connected to the lead line 18. Note that the thyristors employed in the driving power control 22 and the braking control 24 can be replaced with other types of known power controlling elements such as mercury-arc rectifiers.

The power control system 6 comprises a tachometer generator 26 having its shaft connected to the common shaft of the induction motor HM and LM. The tachometer generator 26 generates a voltage which is indicative of the speed of revolution of the common shaft. Since the speed of the rotation of the common shaft is related to the speed of the elevator car, this voltage produced from the tachometer generator 26 is also indicative of the instantaneous speed of the elevator car and, thus it is referred to as an actual speed signal, hereinbelow. A reference signal generating circuit 28 generates a reference voltage which varies in relation to time. One waveform of the voltage produced from the reference signal generating circuit 28 is shown in a graph of FIG. 4 in which the abscissa represents time and the ordinate represents voltage. As it is apparent from the graph, the curve gradually increases at the beginning and gradually reaches a predetermined voltage level Ea and gradually decreases to zero voltage. When the ordinate is represented by the speed of the elevator car, the curve exhibits the ideal speed of the elevator car to be produced with respect to time.

Figure 4:
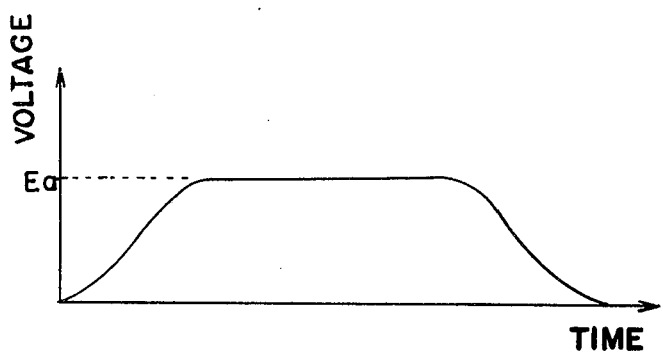
FIG. 4 is a diagram showing the waveform of a reference signal produced from a reference signal producing circuit.

Noted here that the reference signal generating circuit 28 includes a number of switch buttons (not shown), each of which are pushed by an operator to command the elevator car to move from its present position to a desired position, and a voltage producing circuit (not shown) which is so programmed to produce a voltage waveform having the same waveform or a similar waveform to the waveform shown in FIG. 4 and which is automatically actuated corresponding to the one of the switch buttons pressed. When it is desired to move the elevator car a comparatively short distance, the reference signal generating circuit 28 produces one pattern of waveform in which the voltage level Ea is comparatively low while the time during which the voltage level Ea is maintained is comparatively short. On the other hand, when is desired to move the elevator a comparatively long distance, the reference signal generating circuit 28 generates another pattern of waveform in which the voltage level Ea is comparatively high while the time during which the voltage level Ea is maintained is comparatively large.

The voltage produced from the reference signal generating circuit 28 is applied to a comparator 30 which receives the actual speed signal from the tachometer generator 26 and produces a difference signal indicative of the difference in voltage between the reference signal and the actual speed signal. The difference signal produced from the comparator 30 is applied to an amplifier 32 which produces a positive signal when the voltage of the reference signal is higher than that of the actual speed signal and, a negative signal when the voltage of the reference signal is lower than the actual speed signal. No signal is produced from the amplifier 32 when the voltage of the reference signal is equal to that of the actual speed signal. Therefore, the amplitude of the positive and negative signals varies according to the difference between the reference signal and the actual speed signal. The positive signal is applied to a first phase controller 34 which produces a pulsating signal whose frequency is equal to the frequency of the AC voltage produced from the power source 8. The phase of the pulsating signal lags in accordance with the variation in amplitude of the positive signal. The pulsating signal produced from the first phase controller 34 is applied to the gates of the thyristors TH1, TH2 and TH3 contained in the driving power control 22 for firing the thyristors. A decrease in the phase lag of the pulsating signal results in an increase in the power supplied to the induction motor HM. Therefore, the less the phase lags, the larger the driving torque of the induction motor HM so that the speed of the induction motor HM becomes high.

The power control system 6 further comprises an inverter 36 connected to the amplifier 32 to receive the negative signal and to produce an inverted and amplified signal. Thus, the signal produced from the inverter is a positive signal. To distinguish between the positive signal produced from the amplifier 32 and the positive signal produced from the inverter 36, the latter positive signal is referred to as the inverted positive signal, hereinbelow. The inverted positive signal is applied to a second phase controller 38 which also produces a pulsating signal in a manner similar to that of the first phase controller 34 described above. The phase of the pulsating signal produced from the second phase controller 38 lags in accordance with variation in amplitude of the inverted positive signal. The pulsating signal produced from the second phase controller 38 is applied to the gates of the thyristors TH4 and TH5 contained in the braking control 24 for firing the thyristors. A decrease in the phase lag of the pulsating signal produced from the second phase controller 38 results in a reduction a rotation of the induction motor LM. Therefore, the less the phase of the pulsating signal produced from the second phase controller 38 lags, the larger the braking torque of the induction motor LM so that the speed of the induction motor LM becomes slow. Note that, according to a preferred embodiment, the second phase controller 38 has exactly the same structure as that of the first phase controller 34. Therefore, during the manufacture of the elevator control system, two phase controllers having the same structure and the same characteristic are prepared and they are employed as the first and second phase controllers 34 and 38. The operation of the elevator control system of the present invention is described hereinbelow.

Initially, the switches S1, S2, S3 and S4 are opened to maintain the induction motors HM and LM in a suspended state while the reference signal generating circuit 28 generates no reference voltage therefrom. When the operator commands the elevator car to move a predetermined distance in one direction, such as the upward direction, by pressing one of the buttons (not shown), the switches S1 and S4 are closed to supply power to the driving power control 22 and, at the same time, the reference signal generating circuit 28 starts generating a reference signal having a waveform the same as or similar to the waveform shown in FIG. 4. Immediately after pressing the button, the voltage of the reference signal gradually increases. However, at this moment, the power supplied to the driving power control 22 is not applied to the motor HM because the pulsating signal produced from the first phase controller 34 prevents the thyristors TH1, TH2 and TH3 from transmitting power to the induction motor HM. Therefore, the voltage of the actual speed signal produced from the tachometer generator 26 is zero. This zero voltage of the actual speed signal produced from the tachometer generator 26 is compared with the voltage of the reference signal in the comparator 30. Accordingly, since the reference signal is higher than the actual speed signal, the amplifier 32 produces a positive signal to the first phase controller 34. In response to the receipt of the positive signal, the first phase controller 34 advances the pulsating signal produced therefrom. The degree of this phase lag depends upon the voltage level of the applied positive signal. Thereupon, the thyristors TH1, TH2 and TH3 transmit three phase AC power to the induction motor HM which is then rotated. The speed of revolution of the induction motor HM, i.e., the speed of the rotation of the common shaft increases correspondingly with the increase of the reference voltage.

When the voltage of the actual speed signal exceeds that of the reference signal, particularly expected to occur when the voltage of the reference signal becomes low, a negative signal is produced from the comparator 30, which is in turn applied through the amplifier 32 to the inverter 36. The inverted positive signal produced from the inverter 36 is applied to the second phase controller 38 which delays the pulsating signal produced therefrom. Thereupon, the thyristors TH4 and TH5 allow the induction motor LM to excite DC power to brake the elevator car. Therefore, the speed of the rotation of the common shaft is reduced. Note that, during the braking of the induction motor LM, the other induction motor HM provides no driving force to the common shaft since the first phase controller 34 prevents the thyristors from transmitting power to the induction motor HM. The speed of the rotation of the common shaft, that is, the speed of the elevator car is reduced in response to the decrease of the reference signal in voltage.

As hereinabove fully described, the elevator control system of the present invention can control the elevator car to move at a desired speed established by a desired acceleration and reduced by a desired deceleration. Therefore, the elevator car does not make any abrupt change in its speed which often causes the passenger in the elevator car to feel uncomfortable. Since the speed of the elevator car is programmed by the reference signal generating circuit 28, an optimum speed can be obtained for each of the different distances of elevator car movement. Therefore, the elevator car moves from the place where it is located to a required place in the smallest possible time, and yet provides a comfortable ride. From this aspect, the elevator control system of the present invention is applicable to the elevators employed in high rise building where the elevator car is required to make a number of movements in different distances; from a comparatively short distance to a comparatively long distance.

Furthermore, since the elevator control system of the present invention includes the inverter 36 inserted between the amplifier 32 and the second phase controller 38, the second controller 38 operates upon receipt of a positive signal in the same manner as the first phase controller 34 operates. Therefore, the structure of the first and second phase controllers 34 and 38 can be arranged to have exactly the same constitution. Therefore, the manufacturing cost is reduced. Moreover, since the inverter 36 controls the amplitude of the inverted positive signal produced therefrom, it is simple to adjust the degree of phase shift in the second phase controller 38 in relation to the phase shift in the first phase controller 34. In other words, the gain of the positive signal applied to the first phase controller 34 controlled by the amplifier 32, while the gain of the inverted positive signal applied to the second phase controller 38 is controlled by the inverter 36. Therefore, the adjustment of the amplitude of the positive signal and the inverted positive signal can be simply effected.

Although it is possible to arrange the second phase controller 38 in common with the first phase controller 34 by constituting only one phase control which is alternately connected to the driving power control 22 and braking control 24, it is preferable to arrange the first and second phase controllers 34 and 38 as independent phase controls so as to eliminate dead time during the switch-over.

Figure 5:
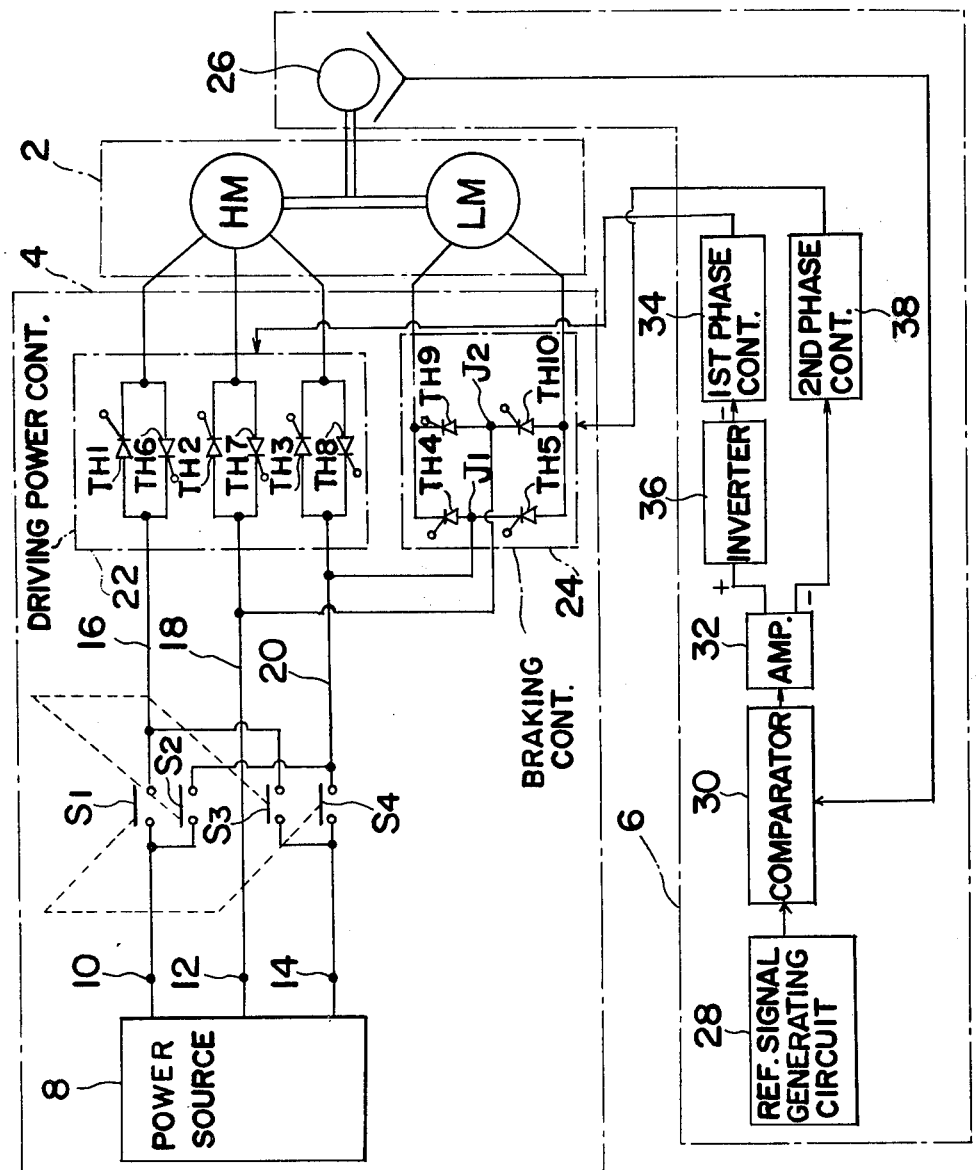
FIG. 5 is a circuit diagram of an elevator control system according to another embodiment of the present invention.

Referring to now to FIG. 5, there is shown an elevator control system according to another embodiment of the present invention. The elevator control system shown in FIG. 5 has the inverter 36 connected between the amplifier 32 and the first phase controller 34, instead of between the amplifier 32 and the second phase controller 38 such as in the foregoing embodiment, so that the first and second phase controllers 34 and 38 operate upon receipt of negative signals.

Furthermore, as shown in FIG. 5, the diodes D1, D2 and D3 which have been described as provided in the driving power control 22 can be replaced with thyristors TH6, TH7 and TH8 respectively. In a similar manner, the diodes D4 and D5 which have been described as provided in the braking control 24 can be replaced with thyristors TH9 and TH10, respectively.

Although the present invention has been fully described by way of examples with reference to the accompanying drawings, note that various changes and modifications are apparent to those skilled in the art. For example, the power supply section 4 can be replaced with any known power supplying system which controls AC power. Moreover, the induction motors HM and LM which have been described as being two separate induction motors can be one induction motor so designed as to serve as a high speed induction motor when it is connected in one way and as a low speed induction motor when it is connected in another way. Therefore, such changes and modifications, unless they depart from the true scope of the present invention, are to be understood as included therein.

What is claimed is:

1. An elevator control system for controlling the speed of an elevator car comprising:
   a power supply means for supplying AC power;
   a first gate means connected to said power supply means having power controlling elements and a first control input for supplying controlled AC power according to the phase of the signal applied to said first control input;
   a driving means connected to said first gate means for driving the elevator car according to the AC power supplied by said first gate means;
   a second gate means connected to said power supply means having power controlling elements and a second control input for supplying controlled DC power according to the phase of the signal applied to said second control input;
   a braking means connected to said second gate means for dynamically braking the elevator car according to the DC power supplied by said second gate means;
   a speed detecting means for detecting the instantaneous speed of the elevator car and for generating an actual speed signal indicative of the detected instantaneous speed;
   a reference signal generating means for generating a reference signal indicative of the ideal speed of the elevator car;
   a comparator means connected to said speed detecting means and said reference signal generating means for comparing said actual speed signal with said reference signal, for generating a positive signal having a voltage indicative of the difference between said reference signal and said actual speed signal when said reference signal is greater than said actual speed signal, and for generating a negative signal having a voltage indicative of the difference between said actual speed signal and said reference signal when said actual speed signal is greater than said reference signal;
   an amplifier means connected to said comparator means for amplifying said positive signal and said negative signal generated by said comparator means;
   a first phase controller means connected to said first gate means and said amplifier means for applying a first pulsating signal to said first control input of said first gate means having a frequency equal to the frequency of the AC power supplied by said power supplying means and a phase according to the voltage of said positive signal;
   an inverter means connected to said amplifier means for inverting and amplifying said negative signal for generating an inverted positive signal; and
   a second phase controller means connected to said second gate means and said inverter means for applying a second pulsating signal to said second control input of said second gate means having a frequency equal to the frequency of the AC power supplied by said power supplying means and a phase according to the voltage of said inverted positive signal.

2. An elevator control system as claimed in claim 1, wherein said driving means comprises a first induction motor.

3. An elevator control system as claimed in claim 1, wherein said braking means comprises a second induction motor.

4. An elevator control system as claimed in claim 1, wherein said driving means and said braking means comprise a third induction motor.

5. An elevator control system as claimed in claim 1, wherein said power controlling elements are thyristors.

6. An elevator control system as claimed in claim 1, wherein said power controlling elements are mercury-arc rectifiers.

7. An elevator control system as claimed in claim 1, wherein said speed detecting means comprises a tachometer generator.

8. An elevator control system as claimed in claim 1, wherein said power controlling elements included in said first gate means comprise thyristors and rectifiers connected in parallel in opposite polarities.

9. An elevator control system as claimed in claim 1, wherein said power controlling elements included in said second gate means comprise thyristors and rectifiers connected in a mixed bridge rectification circuit.

10. An elevator control system as claimed in claim 1, wherein said power controlling elements included in said first gate means comprise thyristors connected in parallel in opposite polarities.

11. An elevator control system as claimed in claim 1, wherein said power controlling elements included in said second gate means comprise thyristors connected in a bridge rectification circuit.

12. An elevator control system as claimed in claim 1, wherein said first and second phase controller means have exactly the same constitution.

13. An elevator control system for controlling the speed of an elevator car comprising:
- a power supply means for supplying AC power;
- a first gate means connected to said power supply means having power controlling elements and a first control input for supplying controlled AC power according to the phase of the signal applied to said first control input;
- a driving means connected to said first gate means for driving the elevator car according to the AC power supplied by said first gate means;
- a second gate means connected to said power supply means having power controlling elements and a second control input for supplying controlled DC power according to the phase of the signal applied to said second control input;
- a braking means connected to said second gate means for dynamically braking the elevator car according to the DC power supplied by said second gate means;
- a speed detecting means for detecting the instantaneous speed of the elevator car and for generating an actual speed signal indicative of the detected instantaneous speed;
- a reference signal generating means for generating a reference signal indicative of the ideal speed of the elevator car;
- a comparator means connected to said speed detecting means and said reference signal generating means for comparing said actual speed signal with said reference signal, for generating a positive signal having a voltage indicative of the difference between said reference signal and said actual speed signal when said reference signal is greater than said actual speed signal, and for generating a negative signal having a voltage indicative of the difference between said actual speed signal and said reference signal when said actual speed signal is greater than said reference signal;
- an amplifier means connected to said comparator means for amplifying said positive signal and said negative signal generated by said comparator means;
- an inverter means connected to said amplifier means for inverting and amplifying said positive signal for generating an inverted negative signal;
- a first phase controller means connected to said first gate means and said inverter means for applying a first pulsating signal to said first control input of said first gate means having a frequency equal to the frequency of the AC power supplied by said power supplying means and a phase according to the voltage of said inverted negative signal; and
- a second phase controller means connected to said second gate means and said amplifier means for applying a second pulsating signal to said second control input of said second gate means having a frequency equal to the frequency of the AC power supplied by said power supplying means and a phase according to the voltage of said negative signal.

* * * * *

UNITED STATES PATENT AND TRADEMARK OFFICE
CERTIFICATE OF CORRECTION

PATENT NO. : 4,213,517
DATED : July 22, 1980
INVENTOR(S) : Koji Ando

It is certified that error appears in the above-identified patent and that said Letters Patent are hereby corrected as shown below:

Column 3, line 38, after "shaft" insert --and--;

Column 4, line 59, after "when" insert --it--;

Column 4, line 64, change "large" to --long--;

Column 6, line 33, before "particularly" insert --which is--;

Column 7, line 55, after "be" insert --embodied by--.

Signed and Sealed this

Fifth Day of May 1981

[SEAL]

Attest:

RENE D. TEGTMEYER

Attesting Officer     Acting Commissioner of Patents and Trademarks